United States Patent [19]
Locke et al.

[11] Patent Number: 5,528,663
[45] Date of Patent: Jun. 18, 1996

[54] DTMF DETECTION FOR VOICE PROCESSING EQUIPMENT

[75] Inventors: Michael E. Locke, Santa Clara; Morteza Hagh-Panah, Pacifica, both of Calif.

[73] Assignee: Siemens Rolin Communication Inc., Santa Clara, Calif.

[21] Appl. No.: 508,789

[22] Filed: Jul. 26, 1995

Related U.S. Application Data

[63] Continuation of Ser. No. 231,949, Apr. 2, 1994, abandoned, which is a continuation of Ser. No. 903,440, Jun. 24, 1992, abandoned.

[51] Int. Cl.⁶ .................................................. H04M 3/04
[52] U.S. Cl. ................................................ 379/31; 379/386
[58] Field of Search ..................... 379/1, 5, 6, 27, 379/29, 351, 386, 372, 283, 373, 23, 31; 381/47

[56] References Cited

U.S. PATENT DOCUMENTS

| | | | |
|---|---|---|---|
| 4,580,016 | 4/1986 | Williamson | 379/31 |
| 4,599,495 | 7/1986 | Richards | 379/351 |
| 4,853,958 | 8/1989 | Rabipour et al. | 379/386 |
| 4,903,292 | 2/1990 | Dillon | 379/930 |
| 5,073,941 | 12/1991 | Locke et al. | 381/47 |
| 5,163,050 | 11/1992 | Cromack | 370/110.3 |
| 5,203,011 | 4/1993 | Bane et al. | 455/34.1 |

FOREIGN PATENT DOCUMENTS

| | | |
|---|---|---|
| 0347038 | 12/1989 | European Pat. Off. . |
| 2219174 | 11/1989 | United Kingdom . |
| 8101623 | 6/1981 | WIPO . |

OTHER PUBLICATIONS

EDN Electrical Design News, Newton, Massachusetts, USA p. 205, vol. 30, No. 6, Mar. 1985 P. Mock 'Add DTMF Generation and Decoding To DSP-uP Designs'.

*Primary Examiner*—Stephen Chin
*Assistant Examiner*—Kevin Kim

[57] ABSTRACT

By testing a received signal for power, frequency content, and stability, one can measurably improve DTMF signal detection and identification performance in voice store and forward systems. The algorithms described here have been found to be especially useful in minimizing talk-off. Further, the approach improves the performance with acoustic-type generators and minimizes transhybrid loss.

12 Claims, 6 Drawing Sheets

DTMF DETECTION FOR VOICE PROCESSING EQUIPMENT

CROSS-REFERENCE TO RELATED APPLICATION

This is a continuation of Ser. No. 08/231,949 filed Apr. 21, 1994, now abandoned, which is a continuation of Ser. No. 07/903,440 filed on Jun. 24, 1992 abandoned.

FIELD OF THE INVENTION

This invention relates to dual tone multifrequency signal (DTMF) reception and detection. Specifically, the invention concerns the improvement of DTMF reception in telephone equipment such as voice store and forward apparatus (VSF), popularly known as voice mail.

BACKGROUND OF THE INVENTION

DTMF is a well known convention for encoding control information on analog telephone lines that simultaneously carry voice signals. Despite the widespread usage of DTMF, there has been a continuing problem of accurately and consistently distinguishing between voice and DTMF. While a human listener can choose to ignore DTMF tones that coincide with a voice message, existing detection equipment occasionally accepts a voice signal as a DTMF signal, a phenomenon known as talk-off. This arises because the human voice includes components in the same spectrum as DTMF.

The problem of talk-off has other implications. For example, acoustically-coupled DTMF generators may cause errors in DTMF reception. Non-linearities in the acoustic coupling can distort DTMF and generate spurious signals which might be interpreted as voice. As another example, outgoing voice signals can mix with incoming DTMF signals in the transhybrid circuit. Because of the finite loss in the transhybrid circuit, the tones will contain additive voice noise, interfering with reception of the tones.

Various schemes have been proposed to address the three problems noted above. To counter talk-off, some have proposed increasing the minimum length of each DTMF signal. While this minimizes talk-off difficulties, it does not eliminate the problem. Moreover, some DTMF generators have fixed maximum lengths too short to be useable here. Further, an excessive length may cause user aggravation.

Some have also attempted to cure talk-off problems by requiting a minimal level of signal power outside of the DTMF band (below 680 Hz and above 2000 Hz), specifically at harmonic frequencies of DTMF tones. Although this yields some improvement, it does not completely eliminate talk-off. Also, measures to limit the acceptable amount of out-of-band power aggravates the finite transhybrid loss problem.

By narrowing the bandwidth of the individual DTMF receiver filters, a modest improvement in talk-off can be achieved. As with the two other schemes noted above, it does not completely eliminate talk-off. Also, there are limits as to how far one may carry this solution, as the Electronics Industry Association (EIA) DTMF standard requires that each filter have a minimum bandwidth of 1.5% of the center frequency to account for frequency variation in individual DTMF tones.

Several arrangements have been proposed to improve the performance of acoustically-coupled generators. Because the harmonics of DTMF generated by the microphone tend to have frequency components above the DTMF band, one solution suggests attenuating out-of-band components. This will result in an improvement although it is not fully reliable. Also, it is not compatible with the previously-noted scheme of requiring minimal out-of-band power to improve talk-off.

The performance of acoustically-coupled generators may also be improved by increasing the length of the tones, instructing the user to hold down each button for an extended period of time. The downside of this technique is that a long tone could be interpreted as two separate digits. This could occur, for instance, if there is a noise burst on the line, effectively "interrupting" the transmitted tone.

Finally, one can improve acoustic senders by literally banging the microphone end of the handset on a hard surface. This action serves to dislodge or loosen the carbon granules in the microphone's diaphragm that may have become packed due to moisture and migration on account of the action of the microphone. While this helps, many users are reluctant to do this.

The third area of focus is detection errors caused by the finite transhybrid loss. One way of minimizing the effect of this loss, described in U.S. Pat. No. 4,431,872, is to block outgoing signals upon detecting an incoming DTMF signal. This is sometimes referred to as early detect. While this statistically improves performance, recognition is not totally reliable. The outgoing signal may itself result in self-talk-off, distorting the outgoing signal.

U.S. Pat. No. 4,521,647 describes another solution to the problem of transhybrid loss. By modifying the outgoing signal whenever a short DTMF signal is received (early detect), the problem of distortion of the output from self-talk-off is greatly diminished. However, the results achieved are inferior to those of the method described in the previous paragraph.

An obvious way of minimizing the transhybrid loss problem is to decrease the transhybrid loss. One may choose to do this statically or dynamically, but either can be costly. Yet another method for minimizing the effects of finite transhybrid loss is attenuation out-of-band frequencies. This yields a modest improvement.

As noted, all of the methods described above result in some improvement, but do not fully solve the problem. Moreover, individual solutions to one of the three problems could aggravate one or both of the other problems.

SUMMARY OF THE INVENTION

It is therefore an object of the invention to improve the talk-off performance of telephone apparatus such as VSF equipment.

It is a further object of the invention to improve the recognition performance of DTMF receivers used with acoustically-coupled DTMF generators.

It is yet a further object of the invention to decrease the effect of finite transhybrid loss.

It is yet a further object of the invention to implement the invention using digital signal processing techniques.

These and other objects are achieved by the improved DTMF system described here. First, a DTMF receiver core provides an identification of the DTMF using a minimum of processing power and time. In addition to identifying the DTMF signal, the receiver core (as configured here) also provides measurements of the power of the signal and its individual components.

The receiver core has several outputs—signal power, component power, and DTMF value—which are provided to a rating algorithm. The rating algorithm evaluates the quality of the input signal, utilizing a set of empirically-developed DTMF value-specific parameters. At the completion of the quality evaluation, the algorithm issues a rating of 1-to-4, 4 being the lowest and considered non-DTMF.

Assuming a rating between 1 and 3, the information (DTMF identification, quality rating, and power) is passed to a timing/stability algorithm, which evaluates the stability of the received DTMF signal. This algorithm collects a history of inputs over varying periods of time and then evaluates the data, using its own set of DTMF value-specific parameters. If there is a change in the DTMF value, or the rating or power varies impermissibly over the interval in question, the signal will be rejected. Otherwise, the signal receives a stability rating and the DTMF value is passed on. A secondary timing algorithm guards against double digit detection caused by momentary signal dropout.

Another feature relates to finite transhybrid loss. By inserting a bandpass filter ahead of the receiver core, errors resulting from finite transhybrid loss are minimized.

BRIEF DESCRIPTION OF THE DRAWINGS

A more complete understanding of the present invention, as well as other objects and advantages thereof not enumerated herein, will become apparent upon consideration of the following detailed description and the accompanying drawings, wherein.

DETAILED DESCRIPTION OF THE INVENTION

In discussing the invention, it will be helpful to look at three of its aspects: a DTMF receiver core algorithm with very high talk-off performance, special detect algorithms designed to decrease talk-off errors and work with acoustically-coupled DTMF senders, and filtering to improve finite transhybrid loss. For the purposes of this discussion, the invention is situated in a voice store forward (VSF) system, but it could be easily incorporated into any device where DTMF tones must be decoded.

Figure 1:
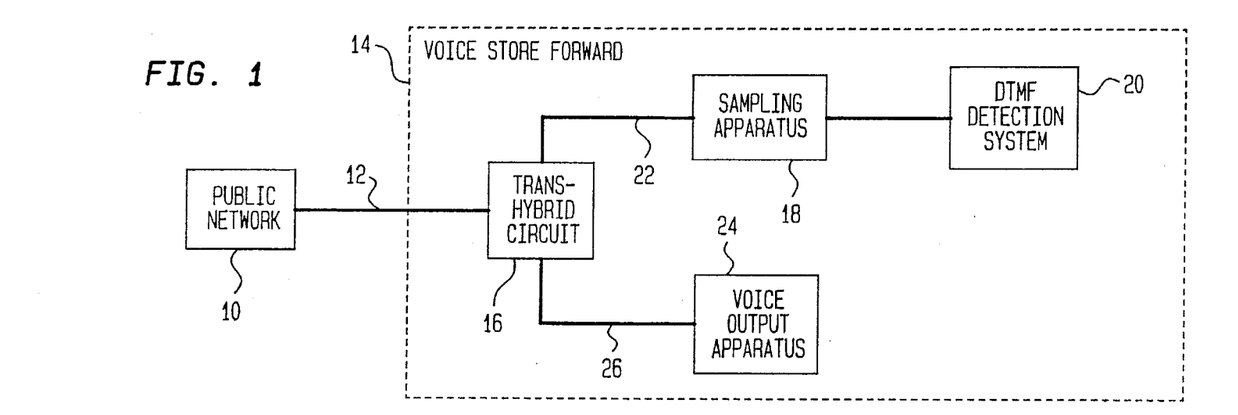
FIG. 1 is a schematic block diagram of a telephone system incorporating the invention.

The environment in which the VSF system functions, as illustrated in FIG. 1, is a public network 10 connected to a telephone line 12. At a hypothetical customer premises, the line 12 is connected to the VSF 14. Internal to the VSF 14 is a transhybrid circuit 16, connected to a sampling apparatus 18 via receive line 22. The sampling apparatus 18 provides 8000 samples per second of the incoming signal; these samples form the input to the DTMF detection system 20, illustrated in block schematic diagram format in FIG. 2.

Finally, the transhybrid circuit 16 is also connected to a voice output apparatus 24 via transmit line 26.

The DTMF detection system 20 described here is intended to be implemented with a general purpose digital signal processor. A suitable processor is one from the ADSP2100 series manufactured by Analog Devices, Inc. of Norwood, Mass., and described in that company's "DSP Products Databook" published in 1987. Of course, one could use a different processor, adapting the information provided here for the particulars of the selected processor.

Figure 2:
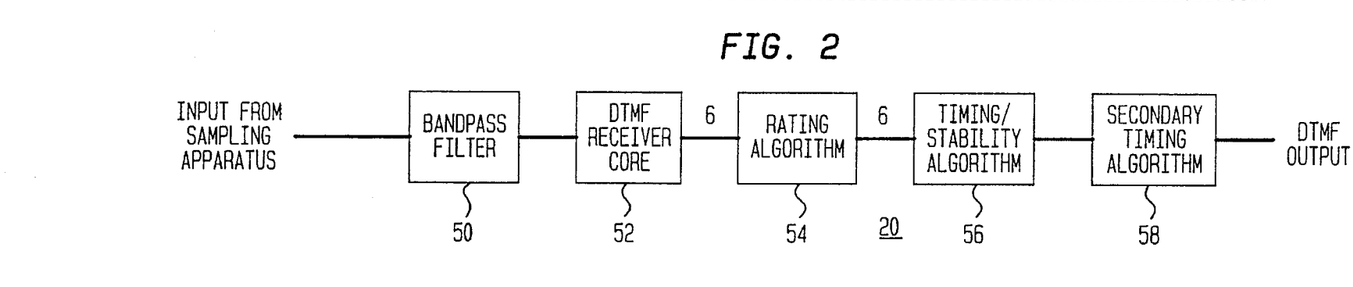
FIG. 2 is a schematic block diagram of the DTMF detection system.

The DTMF detection system 20 has five components: a bandpass filter 50, a DTMF receiver core 52, a rating algorithm 54, a timing/stability algorithm 56, and a secondary timing algorithm 58. The bandpass filter 50 receives the sampled signal input from the sampling apparatus 18 and provides a filtered output to the DTMF receiver core 52. The details of the filter 50 are discussed below. It should be understood that the grouping of functions and stages is one of convenience and not one of necessity. Thus, many of the elements discussed here could be configured as part of one or another of these basic blocks or could exist wholly outside of them.

DTMF Receiver Core

Figure 3:
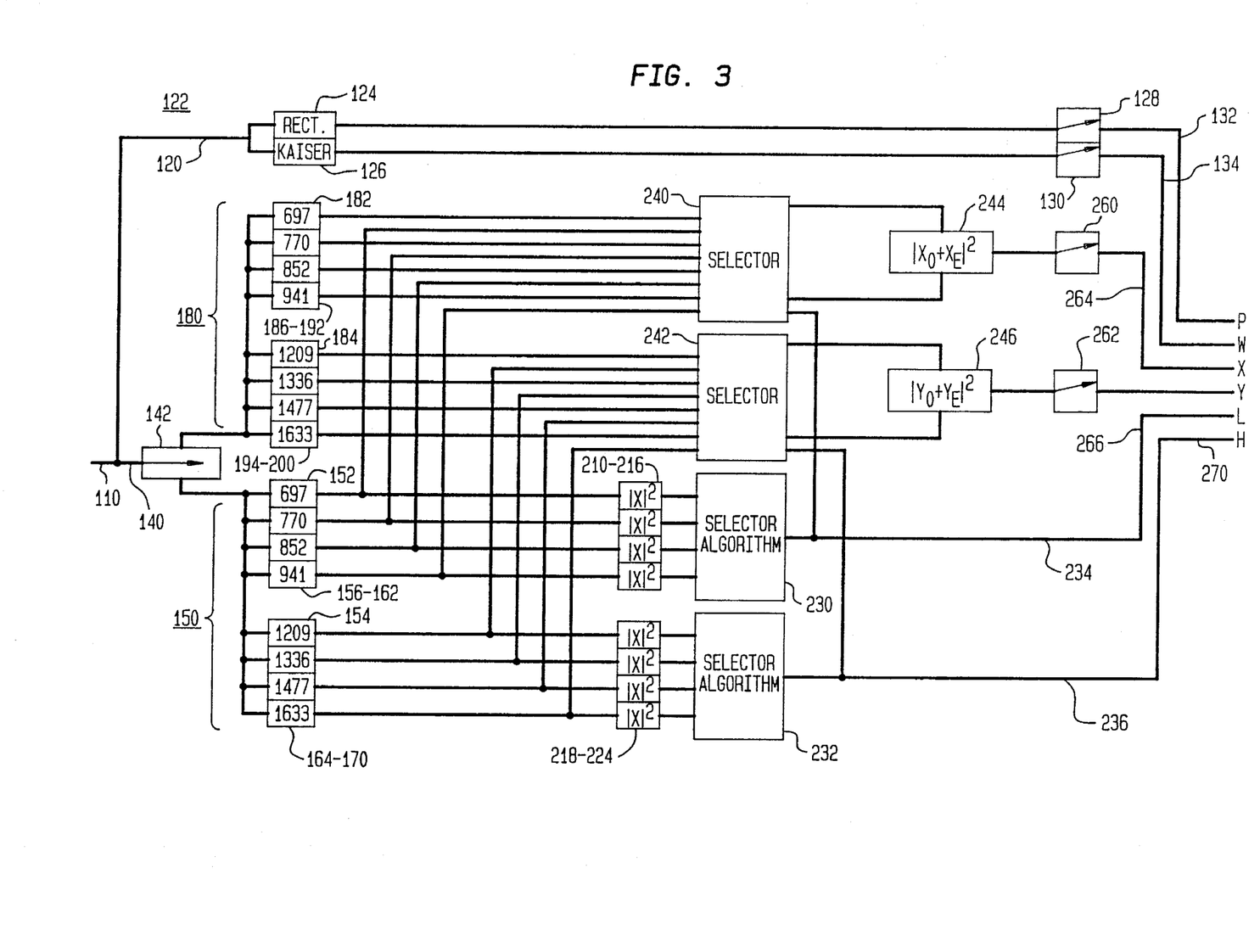
FIG. 3 is a schematic block diagram of the DTMF receiver core.

The DTMF receiver core 52, shown in block schematic form in FIG. 3, has two functions: it decodes the input signal and determines its DTMF value, which may be any one of the set {0,1,2,3,4,5,6,7,8,9,*,#,A,B,C,D}, and calculates the power in the input signal. The input signal to the DTMF receiver core 52, provided to an input 110, follows two routes: a power calculation path 120 and a filter path 140.

Power Calculation

The power calculation 120 path directs the incoming signal to a power calculation step 122, which utilizes two windows—a rectangular window 124 and a Kaiser window 126. Both of these are well known in the digital signal processing art.

The two window functions provide different measurements of power in the received signal. The rectangular window 124 provides a power calculation derived from the sum of the squares of the input signal and offers the best estimate of the signal power of a random signal. Moreover, a rectangular window is optimum for rejecting non-DTMF tones.

The Kaiser window 126, on the other hand, offers the best estimate of the signal power of a DTMF signal. Kaiser windows are well known in the digital signal processing art. The underlying theory and design of Kaiser windows may be found in Rabiner, R. L., and Gold, B., "Theory and Application of Digital Signal Processing," Prentice-Hall, Englewood Cliffs, N.J. (1975). Of course, one could use other types of windows such as a Bartlett, Hamming, or Blackman window.

The following analysis illustrates that a Kaiser window is ideal for determining the power in a pure DTMF signal. A DTMF signal, arbitrarily labeled here f(n), can be represented as:

$$f(n)=A\cos(\omega_1 n)+B\cos(\omega_2 n)$$

where:

A and B are the respective amplitudes of the two frequency components;

$\omega_1$ and $\omega_2$ are the radial frequencies and $\omega_1 > \omega_2$; and n is the time index.

The relative phases of the two signals are irrelevant to this analysis and thus omitted. The square of the dual tone signal, $f(n)^2$, is then:

$$f(n)^2 = A^2 \cos^2(\omega_1 n) + B^2 \cos^2(\omega_2 n) + 2AB \cos(\omega_1 n)\cos(\omega_2 n)$$

but since:

$$\cos^2(X) = \frac{1}{2} + \frac{1}{2} \cos(2X)$$

and:

$$\cos(X)\cos(Y) = \frac{1}{2} \cos(X+Y) + \frac{1}{2} \cos(X-Y)$$

the squared expression is thus:

$$f(n)^2 = \frac{1}{2}(A^2+B^2) + \frac{1}{2} A^2\cos(\omega_1 2n) +$$

$$\frac{1}{2} B^2\cos(\omega_2 2n) + AB\cos(\omega_1 n + \omega_2 n) +$$

$$AB\cos(\omega_1 n - \omega_2 n)$$

The actual power in the dual tone signal is $\frac{1}{2}(A^2+B^2)$. The Kaiser window provides maximum attenuation of frequencies $2\omega_1 n$, $2\omega_2$, $\omega_1+\omega_2$, and $\omega_1-\omega_2$, while passing DC. For DTMF, the lowest value of $\omega_1-\omega_2$ is 1209−941=268 Hz. (See Table 1 on page 24). All but the first component in the above equation drop out, leaving only $\frac{1}{2}(A^2+B^2)$. An 80-tap Kaiser window provides good stop band rejection from 268 through 4000 Hz, while passing DC.

The outputs of the two windows 124 and 126 are provided to individual 80:1 decimators 128 and 130. The decimators 128 and 130 pass 1 out of every 80 sequential inputs to their respective outputs 132 and 134.

Filter Design

The filter path 140 is connected to a 2:1 decimator 142. As opposed to the 80:1 decimators 128 and 130 noted above, the 2:1 decimator 142 does not discard samples. Rather, it passes the even samples to a lower filter bank 150 and odd samples are passed to an upper filter bank 180. For simplicity of discussion and illustration, two distinct filter banks 150 and 180 are shown here. However, it should be understood that one can achieve the same result using one set of filters, properly routing the necessary inputs to the appropriate filters at the correct times.

The filter banks 150 and 180 each have low band sections 152 and 182, respectively, and high band sections 154 and 184, respectively. The low band sections 152 and 182 have four individual filters 156, 158, 160, and 162, and 186, 188, 190, and 192, respectively, for each of the four low band frequencies 697, 770, 852, and 941 Hz. The high band sections 154 and 184 have four individual filters 164, 166, 168, and 170, and 194, 196, 198, and 200, respectively, for each of the four high band frequencies 1209, 1336, 1477, and 1633 Hz.

The DTMF receiver core 52 employs narrow band frequency selective filters. This type of filter allows the DTMF receiver core 52 to accomplish two tasks. The first is to determine the DTMF value or identity of that signal when a DTMF signal is present. In other words, whether is it a DTMF 1 or 2 or 3, etc. The second is to determine the amplitudes of the individual tones that make up the DTMF signal when a DTMF signal is present. As explained further on, the tone amplitudes will be used to qualify the input sample as a valid DTMF signal.

Each of the filters is implemented as an 82-tap complex FIR filter. A length of 82 was chosen as a tradeoff between frequency and time resolution. The filters are optimized for separation of a single complex exponential component from a valid DTMF signal.

The filters employed in the DTMF receiver core 52 should be distinguished from the matched filter problem, where one assumes that one is attempting to detect a particular waveform embedded in white noise. Here, the input signal is represented by the following:

$$f(n) = A \cos(\omega_1 n) + b \cos(\omega_2 n) + q(n)$$

where $q(n)$ is white noise.

For the $\omega_1$ detection filter, the desired signal is:

$$G(n) = e^{i\omega_1 n}$$

where $i = \sqrt{-1}$

Thus, the noise consists of:

$$e^{i(-\omega_1 n)} + e^{i(\omega_2 n)} + e^{i(-\omega_2 n)} + q(n)$$

Ideally, the filters should have good overall stopband attenuation to minimize $q(n)$ and high attenuation at $-\omega_1$, $\omega_2$, and $-\omega_2$. The filters can be designed using Least Mean Square (LMS) recursion, hand manipulation of the zero locations of a matched filter, or any other suitable method. Good performance, within a few percent accuracy, was obtained using hand manipulation.

To design the filters, one can begin with a function representative of a matched filter using a truncated complex exponential. This is equivalent to a rectangular low pass filter that has been complex frequency shifted to the desired center frequency. This type of filter has substantial side lobes, many being coincident with undesirable noise frequencies, including $-\omega_1$, $\omega_2$, and $-\omega_2$. The side lobes can be reduced by increasing the window length or by using a tapered window. However, DTMF processing time specifications practically limit the length that can be utilized. Also, a tapered window will greatly increase the bandwidth of the main lobe of the frequency response. For the lower DTMF frequencies, this widening is not acceptable.

In this embodiment, a length of 10 ms, based on the sampling rate, was found to be optimum. A shorter length (5 ms) resulted in no detection of DTMF tones and a longer length (20 ms) led to severe talk-off problems.

Beginning with the filter function, the zeroes are located and then adjusted to achieve the desired frequency response. In the Z domain, assuming a length of N, the filter can be represented as:

$$W(z) = 1 + z^{-1} + z^{-2} + \ldots + z^{-(N-1)}$$
$$= \frac{(1 - z^{-N})}{1 - z^{-1}}$$

The zeroes of $(1-z^{-N})$ are:

$$z^{-1} = e^{i(2\pi m/N)}$$

where $0 < m < N$ and $i$ is the square root of $-1$.

The term $(1-z^{-1})$ is zero at $z=1$, corresponding to zero for $m=0$ in the numerator term. This yields:

$$W(z) = \prod_{m=1}^{N-1} (z^{-1} - e^{i(2\pi m/N)})$$

The rectangular windowed complex filter has the impulse response of:

$$h(n) = w(n)e^{i(2\pi fn)}$$

The z-transform of h(n) is:

$$\begin{aligned} H(z) &= W(ze^{-i(2\pi f)}) \\ &= \prod_{m=1}^{N-1} [(ze^{-i(2\pi f)})^{-1} - e^{i(2\pi m/N)}] \\ &= C \prod_{m=1}^{N-1} [z^{-1} - e^{2\pi(-f+m/N)}] \end{aligned}$$

where $C = e^{2\pi i f(N-1)}$

However, C is irrelevant to the design, as it is a constant of unity magnitude.

Having developed the z-transform for the filter, the frequency response can be plotted using commonly available utility programs such as ILS (Signal Technology, Inc., Goleta, Calif.). This will identify which zeroes need to be moved. One may use a polynomial divide as a tool to remove a zero and a polynomial multiply to add a zero.

The object is to cluster zeroes near the positive and negative frequencies of the alternate frequency group. For instance, if the filter is for a low band frequency (i.e., 697, 770, 852, or 941 Hz), the zeroes should be clustered around the high band frequencies (i.e., 1209, 1336, 1477, and 1633 Hz). Also, some zeroes should be clustered near the negative of the main lobe frequency of this filter. The actual position of the zeroes is determined by trial and error and is largely dependent on the performance desired by the user.

Filter Operation

The even input samples provided by the 2:1 decimator 142 are fed to the inputs of the lower filter bank's 150 low band and high band sections 152 and 154. The outputs of each of the low band filters 156, 158, 160, and 162 are operated on by individual low band magnitude squaring functions 210, 212, 214, and 216. Similarly, the outputs of each of the high band filters 164, 166, 168, and 170 are operated on by individual high band magnitude squaring functions 218, 220, 222, and 224.

The outputs of the low band magnitude squaring functions 210, 212, 214, and 216 are the inputs to a low band selection algorithm 230 while the outputs of the high band magnitude squaring functions 218, 220, 222, and 224 are the inputs to a high band selection algorithm 232. The low band selection algorithm 230 determines which of the inputs, representing one of the low band frequencies 697, 770, 852, and 941 Hz, has the largest magnitude. Similarly, the high band selection algorithm 232 determines which of the inputs, representing the high band frequencies 1209, 1336, 1477, and 1633 Hz, has the largest magnitude. These two results are taken to be the respective DTMF tones of the original input signal. For example, if the largest magnitude signal from the low band has a frequency of 770 Hz and the largest magnitude from the high band has a frequency of 1209 Hz, the DTMF receiver core 52 would report that the sample input is a DTMF 4 signal (see Table 1 on page 24).

The odd sample output of the 2:1 decimator 140 is now filtered. However, since a preliminary identification of the DTMF signal has now been made, there is no purpose in enabling filters for the other six tones. Therefore, only two individual filters in the upper filter bank 180, one for one of the low band frequencies, 697, 770, 852, and 941 Hz, and one for one of the high band frequencies, 1209, 1336, 1477, and 1633 Hz, are enabled. This saves considerable processing time, reducing the overall requirements for the DTMF receiver core 52 by almost half. Thus, by splitting the incoming signal into two parts and enabling the entire set of filters for only half of the signal, that is the even samples, the computational efficiency of the DTMF receiver core 52 is vastly improved.

The results of the low and high band selection algorithms 230 and 232 determine which of the individual filters in the low band section 182 (individual filters 186, 188, 190, or 192) and the high band section 184 (individual filters 194, 196, 198, and 200) the upper filter bank 180 are activated. In the DTMF receiver core algorithm 52, this selection is effected by a low band filter selector 240, which responds to the output 234 of the low band selection algorithm 230 and a high band filter selector 242, which responds to the output of 236 of the high band selection algorithm 232.

At this point, the odd and even samples are recombined to recreate the original 8000 sample per second signal. The low band filter selector 240 connects the selected output of the lower filter bank's 150 low band section 152 and the upper filter bank's 180 low band section 182 to a low band magnitude squaring function 244. The high band filter selector 242 connects the selected output of the lower filter bank's 150 high band section 154 and the upper filter bank's 180 high band section 184 to a high band magnitude squaring function 246.

The output of the low band magnitude squaring function 244 is decimated by an 80:1 low band decimator 260 while the output of the high band magnitude squaring function 246 is decimated by an 80:1 high band decimator 262. The decimators further reduce the filter processing and the signal handling requirements for the subsequent stages. The greatest processing requirement reduction is obtained by decimating the filter outputs 80:1. Further, an 80:1 rate was chosen because it is the largest amount of decimation that can be used with an 82-tap filter. A lesser amount of decimation yields a slight improvement in performance. Additional details of this configuration can be found in U.S. Pat. No. 5,073,941, incorporated herein by reference.

The Rating Algorithm

The outputs 270 of the DTMF receiver core algorithm 52 form the inputs to the rating algorithm 54. Since the input to the DTMF receiver core algorithm 52 is 8000 samples per second, an 80:1 decimation of the algorithm 52 outputs generates a set of inputs for the rating algorithm 54 every 10 ms. There are six inputs: output 132 of decimator 128—the rectangular window measurement of total signal power ("P"), output 134 of decimator 130—the Kaiser window measurement of total signal power ("W"), the output 234 of low band selection algorithm 230—the identity of the low band tone, the output 236 of high band selection algorithm 232—the identity of the high band tone, the output 264 of 80:1 filter output decimator 260, which represents the low band tone power ("X"), and the output 266 of 80:1 filter output decimator 262, which represents the discrete high band tone power ("Y").

The rating algorithm 54 is a frequency domain algorithm that tests for a number of relationships between the inputs. When a DTMF signal is present, these relationships will have restricted values. Talk-off can be minimized by discarding signals that do not meet these standards. The permissible ranges for the various inputs can be extended with empirically-determined values. This will permit the algorithm to recognize DTMF of poor quality.

Each sample tested by the rating algorithm 54 will receive a rating of 1–4 according to the following scale:

1=pure DTMF with no measurable distortion
2=DTMF with small amount of measurable distortion
3=DTMF with significant amount of distortion
4=signal is not DTMF Each test performed by the rating algorithm 54 has three levels, with a unique set of parameters assigned to each level, level 1 being most restrictive and level 3 being the least. Of course, there could be more than three levels of passing signals.

In operation, a sample is first subjected to all of the tests using level 1 parameters. If the sample passes every test, the sample is assigned a rating of 1. However, if the sample failed any of the level 1 tests, the tests are run for level 2. If it is successful at level 2, then it is assigned a level 2 rating. On the other hand, if a level 2 test is failed, the level 3 tests are performed. Should the sample fail to pass any level 3 test, the sample is assigned a rating of 4. The ultimate rating is the highest level (i.e., the lowest numerical value) at which the sample passes all tests.

To pass the tests posed by the rating algorithm 54, the system demands a DTMF signal or its equivalent. Since it is very difficult for a human voice to produce two pure sinusoids, the rating algorithm 54 will give a 4 rating to most voice signals, thus preventing talk-off.

There are seven tests in the rating algorithm 54: a signal-to-signal+noise ratio test labeled SSNR, three sanity tests labeled Sanity1, Sanity2, and Sanity3, respectively, two twist tests labeled Twist1 and Twist2, respectively, and a power test labeled TotalPower. SSNR, Twist1, Twist2, and TotalPower verify properties that all DTMF signals should have. The seven tests are listed below:

| Test | Algorithm |
|---|---|
| SSNR | $X + Y > param_1 W$ |
| Sanity1 | $X + Y < param_2 W$ |
| Sanity2 | $W < param_3 P$ |
| Sanity3 | $P < param_4 W$ |
| Twist1 | $X < param_5 Y$ |
| Twist2 | $Y < param_6 X$ |
| TotalPower | $X + Y > MinPower$ | where:
X is the magnitude squared output of the low band filters;
Y is the magnitude squared output of the high band filters;
P is the rectangular window total signal power; and
W is the Kaiser window total signal power.

These seven tests are "true" for valid DTMF.

The sanity tests insure that the total signal comprises only the sum of the contribution of each tone and not other spurious components. The sanity tests verify properties a stationary signal will have which a non-stationary signal might not have. For example, if the signal power is concentrated in the first and last few samples, evidencing a non-DTMF signal, the Kaiser windowed signal power estimate W will be low. However, the rectangular windowed signal power P is used as a check to verify the true power level.

Twist is the difference between the amplitudes of the high and low frequency components of a DTMF signal. Since high frequencies diminish more rapidly than low frequencies on a telephone line, the high frequency tone is usually set 2 dB higher. Thus, twist is nominally 2 dB. The EIA specification provides that an acceptable DTMF signal can have a twist ranging from +4 to −8 dB; therefore, level 1 parameters should be selected to allow this degree of variation.

The values of the parameters ($param_1$, $param_2$, $param_3$, $param_4$, $param_5$, $param_6$, and MinPower) are empirically selected to optimize talk-off performance. To obtain the values of these parameters, each of the seven tests are run using a sample universe of DTMF, DTMF with voice, and acoustic-coupler DTMF. The parameters are adjusted until the tests pass (i.e., are true) for the desired performance at each of the three levels. One should keep in mind that the goal of the selection process is to minimize talk-off.

At the first level, representing pure DTMF, the input sample is EIA standard DTMF. Each parameter is adjusted until the sample minimally passes the respective test. Next, the tests are run at the third level, representing acoustic-coupler DTMF. Using samples of acoustic-coupler-generated DTMF, the parameters are again adjusted until the tests are passed, the values being selected for minimal passage. Finally, using an input sample of DTMF with voice, the parameters are selected for the second level (medium quality DTMF). By observing the behavior of the system and using approximation, one can select a parameter set optimal for such signals.

One may also further specify separate parameters for each DTMF value, as the specific frequencies involved will exhibit different behavior for each of the tests of the rating algorithm 54. This will result in 16 sets of parameters for each performance level, requiring considerable memory. One can achieve good performance by providing two sets of parameters, one for the DTMF values of {2,3,6,B,C}, and another set for the DTMF values of {0,1,4,5,7,8,9,*,#,A,D}. The reason for this selection will become apparent from the discussion in the section discussing acoustic senders.

If desired, one could perform the SSNR and Sanity1 tests using the output of the rectangular window or some other power detecting scheme. Thus, for the rectangular window output, the tests become:

SSNR $X+Y>param_1 P$
Sanity1 $X+Y<param_2 P$

However, better results are obtained using the output of a Kaiser window.

Timing/Stability Algorithm

The rating algorithm 54 provides six outputs: the sample rating of 1–4, the DTMF value {0,1,2,3,4,5,6,7,8,9,*,#,A,B,C,D}, the rectangular windowed signal power P, the Kaiser windowed signal power W, the magnitude squared output of the low band filter X, and the magnitude squared output of the high band filter Y. These outputs form the inputs to the timing/stability algorithm 56.

The timing/stability algorithm 56 verifies that the signal has been present long enough and consistently enough to be a valid DTMF signal. For example, the DTMF value is required to be the same over the entire interval of interest. Because the human voice cannot maintain a constant output for long periods of time while a DTMF generator should yield a steady signal, this algorithm helps to further distinguish between voice and DTMF, preventing talk-off events not caught by the rating algorithm 54. Also, since unstable signals such as voice will cause the selected DTMF value to vary, a varying input can be detected by the timing algorithm to further improve talk-off performance.

As contrasted with the frequency-domain rating algorithm 54, the timing/stability algorithm 56 is a time domain algorithm. In operation, successive samples of the inputs are stored to create a history for a fixed span of time (e.g., 30 ms). Then, minimum and maximum values are obtained for each of the inputs P, W, X, and Y. Also, the algorithm 56 collects the reported DTMF values and quality ratings for this time span.

For inputs P, W, X, and Y, there is an empirically-determined parameter, which is the ratio of the minimum and maximum value of the specific input for which DTMF is valid. In this embodiment, there are three levels at which DTMF will qualify, going from the highest quality of acceptable DTMF to the lowest. Therefore, each input monitored by the timing/stability algorithm 56 will have a set of three parameters. Further, for each level, the algorithm 56 varies the capture period—30 ms for level 1, 40 ms for level 2, and 70 ms for level 3. If the input minimum/maximum ratio exceeds the parameter specified for the given level, the algorithm assumes that the input signal does not qualify for this level and proceeds to the next level until level 4 (non-DTMF) is reached. In practice, the minimum/maximum ratio is compared to the parameter using the form: minimum>parameter·maximum. (The number of levels (three) is arbitrary as are the lengths of the three time periods.)

In evaluating the stability of the quality rating (from rating algorithm 54), the algorithm 56 looks for the lowest rating (largest number) in the history. Beginning with the first level, the algorithm 56 will look to see if there is any report lower than level 1. If so, the level 1 test has failed and the algorithm 56 will examine a larger sample set (in a 40 ms period), testing to see if there are any reports below level 2 (i.e., 3). If level 2 is not satisfied, the algorithm 56 will move to level 3, examining a 70 ms history.

The test for stability of the DTMF value looks to see whether there has been any change in the value during the capture period (30, 40, or 70 ms). Should the DTMF value vary at any time during the period for that level, the signal is rejected as being talk-off and the next level is tested.

When the analysis has been completed, the timing/stability algorithm 56 will issue a stability rating of 1–4 for each input, depending on which level was successfully completed. Note that the quality rating stability test demands that the timing/stability rating not exceed any one of the ratings in the history. Thus, if the history is the series of four ratings {1, 2, 3, 2}, the highest rating it may issue is a 3.

The values of the ratios for P, W, X, and Y are empirically selected, by running the algorithm 56 using the same sample universe of DTMF, DTMF with voice, talk-off, and acoustic-coupler DTMF. The ratios are adjusted until the tests pass for the performance desired at each of the three levels for the given DTMF values.

The timing/stability algorithm 56 can employ alternative means of evaluating stability. For example, instead of using ratios of maximums and minimums, one could measure the standard deviation of inputs P, W, X, and Y.

Secondary Timing Algorithm

The output of the timing/stability algorithm 56 is provided to the secondary timing algorithm 58. This algorithm detects the beginning and end of DTMF signals so that a single DTMF report is generated per telephone keypush. Its function is to avoid unnecessary failures caused by short "dropout."

The secondary timing algorithm 58 has two states: idle and active. In the idle state, it will only respond to DTMF ratings 1, 2, or 3. Upon receipt of a 1, 2, or 3 rating, the algorithm 58 switches to the active state, and records and reports the current DTMF value. Once in the active state, the algorithm looks for the end of DTMF signal, indicated by receipt of DTMF rating of 4 for a minimum period of time, the "dropout time," or a change in the DTMF value from the recorded value again for a minimum period of time. The algorithm checks the current value of both the DTMF value and rating every 10 ms. The occurrence of either event (level 4 rating or change in DTMF value for the dropout period) indicates that the DTMF signal has terminated. The algorithm then reverts to the idle state. The user can select a dropout rate to suit performance requirements.

Interaction of the Algorithms

To examine how talk-off prevention is achieved by the four algorithms (52, 54, 56, and 58), it is helpful to again consider the human voice in the context of the tests of the algorithms. The human voice can be modelled as time-varying impulse train generator feeding a time-varying filter.

The impulse train generator creates narrow spectral lines of equal amplitude. The filter causes the spectral lines to have differing heights and, because it has a limited q, the adjacent spectral lines will be of comparable amplitude. However, widely separated spectral lines may have widely different amplitudes. Further, the filter has a low-pass characteristic, as low frequencies have a greater amplitude than high frequencies (f>2000 Hz).

Fricative and plosive sounds are not considered as they do not have a pitch and are empirically known not to cause talk-off. The human voice generates limited high frequency components and, as telephone microphones have limited low frequency (below 500 Hz) response characteristics, the telephone limits the low frequency content. Therefore, most of the signal power for voice signals is concentrated in the same bandwidth as the DTMF signals.

The objective of the four algorithms (52, 54, 56, and 58) is to detect the presence of significant signal power, possibly near either or both of the DTMF frequencies bands, that is not a valid DTMF signal. If invalid signal power is too close to a DTMF frequency, it will be included in the amplitude estimate for that frequency. However, the filter output will contain two complex exponentials instead of one, causing either or both of the Sanity1 or SSNR tests to fail, depending on the relative phases of the two frequencies. The signal will also fail the timing/stability algorithm 56.

If the interfering signal has enough amplitude, the DTMF value may fluctuate. If the signal power is far enough away from the DTMF frequency band to be separated by the filter, then the SSNR test will fail.

Acoustic Sender Accommodations

Figure 8:
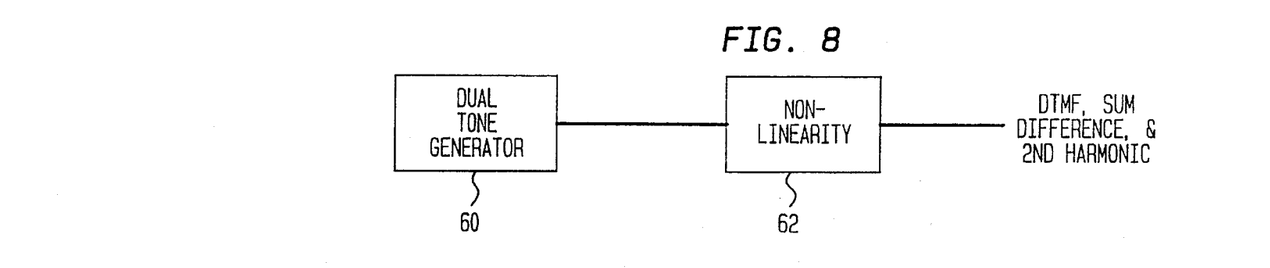
FIG. 8 is a schematic block diagram of an acoustically-coupled DTMF sender.

The four algorithms (52, 54, 56, and 58) can be enhanced to improve DTMF detection when the generator is an acoustically-coupled device. An acoustically-coupled DTMF generator can be modelled as a dual tone generator 60 followed by a non-linearity 62, as shown in FIG. 8. The output of the generator includes, in addition to the DTMF signal, the sum, difference, and second harmonics of the generated DTMF components. It has been empirically determined that the harmonics that fall in the same bandwidth as the DTMF frequencies have the largest amplitude.

Because DTMF signals from an acoustic sender are usually long, as compared with DTMF signals generated by other sources, DTMF from an acoustic sender are usually valid at a rating of 3 from both the rating algorithm 54 and the timing/stability algorithm 56. However, accepting all signals at a rating of 3 is unreliable and likely to cause errors. This is because the minimum and maximum values in the timing/stability algorithm 56 swing through very wide ranges.

Since the frequency domain analysis in the DTMF receiver core algorithm 52 is performed with 10 ms length filters and windows, the frequency resolution is less than 100 Hz. If there is a substantial harmonic present within 100 Hz of the DTMF frequency, it will not be separated from the DTMF frequency. Moreover, whenever two tones, one valid and the other spurious, pass through the DTMF filters, the timing/stability algorithm 56 reports substantial time variation in the detected signal because of the phase difference between the two. From the table shown below, one can see that DTMF values of 2, 3, 6, B, and C have difference frequency and low frequency second harmonics within 100 Hz of valid tones, and thus exhibit this phenomenon.

TABLE 1

| DTMF | LOW | HIGH | SUM | DIFF | 2 × LOW | 2 × HIGH |
| --- | --- | --- | --- | --- | --- | --- |
| 0 | 941 | 1336 | 2277 | 395 | 1882 | 2672 |
| 1 | 697 | 1209 | 1906 | 512 | 1394 | 2418 |
| 2 | 697 | 1336 | 2033 | 639* | 1394* | 2672 |
| 3 | 697 | 1477 | 2174 | 780* | 1394* | 2954 |
| 4 | 770 | 1209 | 1979 | 439 | 1540 | 2418 |
| 5 | 770 | 1336 | 2106 | 566 | 1540 | 2672 |
| 6 | 770 | 1477 | 2247 | 707* | 1540* | 2954 |
| 7 | 852 | 1209 | 2061 | 357 | 1704 | 2418 |
| 8 | 852 | 1336 | 2188 | 484 | 1704 | 2672 |
| 9 | 852 | 1477 | 2329 | 625 | 1704 | 2954 |
| * | 941 | 1209 | 2150 | 268 | 1882 | 2418 |
| # | 941 | 1477 | 2418 | 536 | 1882 | 2954 |
| A | 697 | 1633 | 2330 | 936 | 1394 | 3266 |
| B | 770 | 1633 | 2403 | 863* | 1540* | 3266 |
| C | 852 | 1633 | 2485 | 781* | 1704* | 3266 |
| D | 941 | 1633 | 2574 | 692 | 1882 | 3266 |

*These harmonics are within 100 Hz of one of the generating DTMF frequencies.

The tests conducted by the algorithms can be relaxed by using less restrictive parameters for DTMF values 2, 3, 6, B, and C. Therefore, separate sets of parameters, one for the DTMF values of {2,3,6,B,C}, and another set for the DTMF values of {0,1,4,5,7,8,9,*,#,A,D}, are provided. The first set are less stringent that the second, effectively relaxing the tests posed by the algorithms.

Understandably, relaxation of the tests will result in more frequent talk-off events. To avoid an increase in talk-off related failures, the number of valid DTMF signals that can be used during talk-off critical times can be restricted. For example, one can design the user interface to reject DTMF values of 2, 3, 6, B, and C during such intervals, for example, when recording voice. The other 11 DTMF signals (0, 1, 4, 5, 7, 8, 9, *, #, A, and D) remain available for use because, even though the user is talking, the system must still be capable of accepting DTMF. As a further precaution, one might restrict acceptable DTMF signals to * and 0 during this time. Finally, adjustment of finite transhybrid loss bandpass filter may yield some improvement.

Finite Transhybrid Loss Filtering

Performance deficiencies caused by finite transhybrid loss may be lessened by removal of out-of-band frequencies. A bandpass filter 50, with a passband of 200–2000 Hz, inserted ahead of the DTMF receiver core algorithm 52, will serve to attenuate signal components at these undesirable frequencies. It has been empirically determined that a filter does not substantially affect talk-off performance and that 15–20 dB attenuation in the stop band provides excellent performance. Greater attenuation yields little improvement; less causes the receiver to make more errors.

Operation

The operation of the device will now be explained with reference to the flow charts in FIGS. 4–7. In the following discussion, the numbers in parentheses refer to the flow chart box numbers while the numbers not in parentheses refer to the elements discussed above and appearing in FIGS. 1, 2, and 3.

Figure 4:
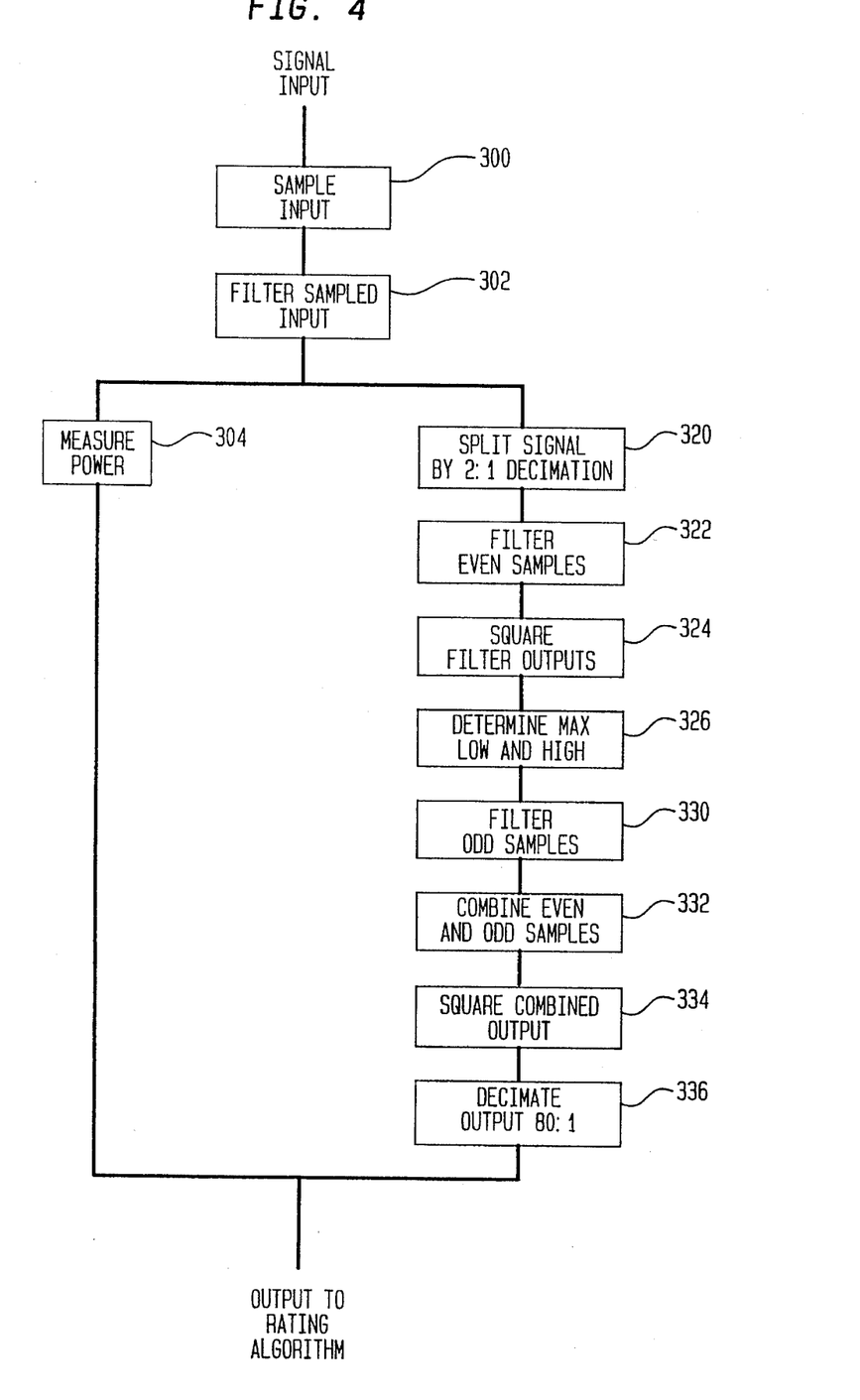
FIG. 4 is a flow chart of the DTMF receiver core algorithm.

Beginning with FIG. 4, the analog input is sampled to produce an 8000 sample/second digital signal that is provided to the DTMF receiver core (300). The signal passes through a bandpass filter 50 to minimize the effects of finite transhybrid loss (302). Now, the signal is measured for power and frequency content.

Two power calculations are performed: a rectangular window measurement 124 and a Kaiser window measurement 126 (304). Each calculation is performed at an 80:1 decimation rate (decimators 128 and 130). The result of the rectangular window calculation is designated "P" while the Kaiser window calculation result is designated "W."

The frequency measurement phase begins with the signal being divided into odd and even samples by the 2:1 decimator 142 (320). The even samples are filtered by the filters of the low band section 152 and the filters of the high band section 154 in the lower filter bank 150 (322). The outputs of each filter are magnitude squared (324) and then provided to the low and high band selection algorithms 230 and 232 for a determination of the highest magnitude in each band (326). The results of this determination are the DTMF tone frequencies and thus the identity of the particular DTMF signal.

Next, the odd samples of the input signal from the 2:1 decimator 142 are filtered, but only by the filters corresponding to the two frequencies indicated by the selection algorithms 230 and 232 (330). The filter outputs of the odd samples and the even samples are then combined to construct a filtered DTMF sample string (332). This step restores, at the filter outputs, a full complement of samples effectively achieving what would have been the output of the filters had the input signal not been decimated odd/even, with no delay. This improves the accuracy of the subsequent tests run by the rating, timing/stability, and secondary timing algorithms (54, 56, and 58).

The combined outputs are then magnitude squared to indicate the respective power in each of the two DTMF tones (334). This signal is also decimated by 80:1 decimators 260 and 262 (336). The outputs are designated "X" and "Y," representing the low and high band power, respectively.

This concludes the processing by the DTMF receiver core 52. The outputs of the core 52, the rectangular window power calculation P, the Kaiser window power calculation W, the low band power X, the high band power Y, and the respective tone values form successive sample sets that are the inputs to the rating algorithm 54. The rating algorithm 54, shown in flow chart form in FIG. 5, performs seven tests on each sample set, as described above.

Figure 5:
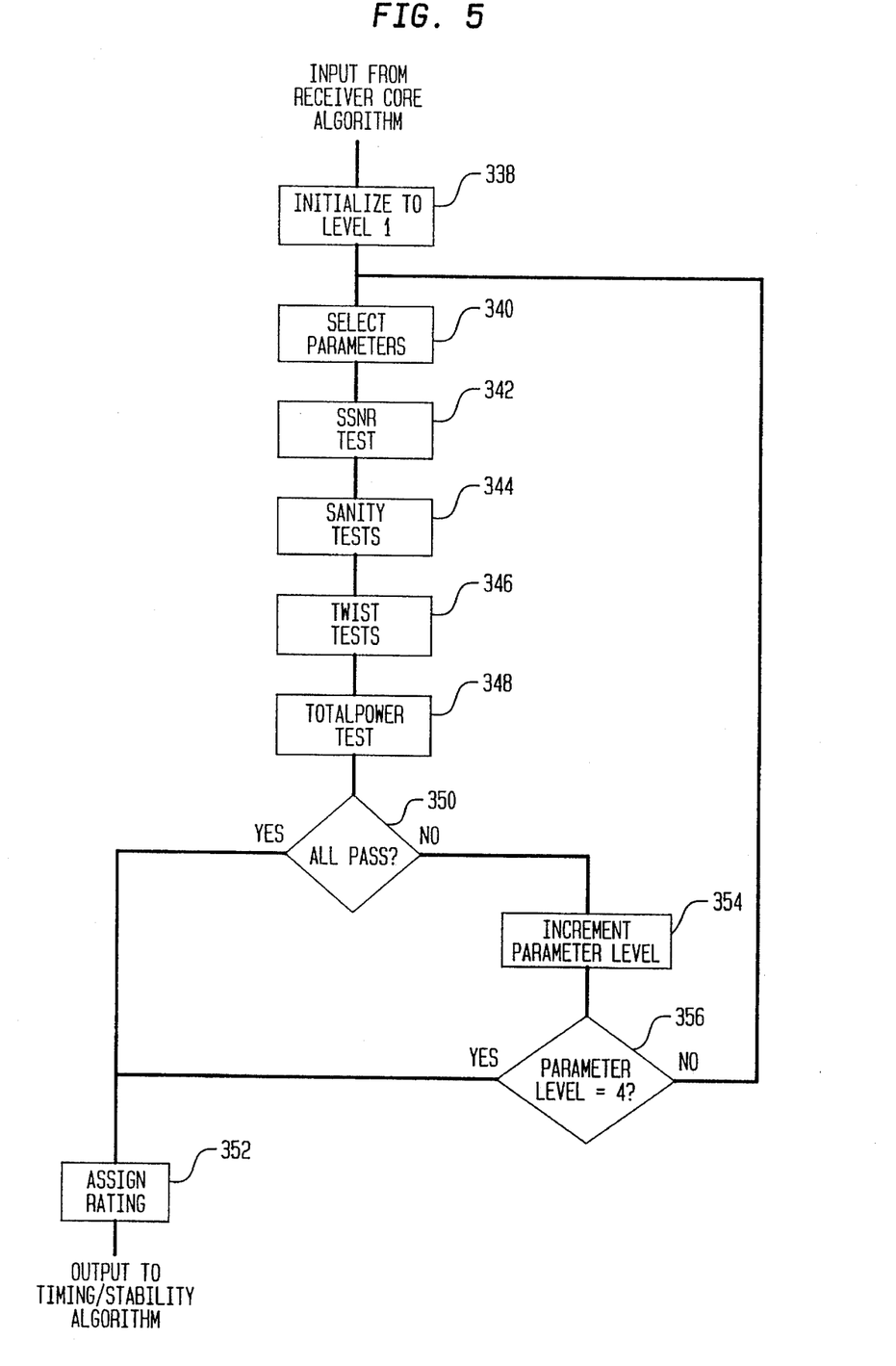
FIG. 5 is a flow chart of the rating algorithm preceded by the sampling and bandpass filtering functions.

At the outset, the rating algorithm 54 is initialized to level 1 (338) and then it selects the parameters for level 1 for the given DTMF value (340). Then, the algorithm 54 runs through the SSNR, Sanity, Twist, and TotalPower tests (342–348). The order of the tests shown follows the description above, but should be understood to be arbitrary. If all the tests pass (350), the rating algorithm 54 assigns the sample set a rating corresponding to the current level of parameters, which at the outset is 1 (352) and data is then passed along to the timing/stability algorithm 56 (368 et seq.).

However, if the sample set fails any of the tests, the parameter level is incremented until level 4 is reached (354, 356), and the tests are again run at the new level for the given DTMF value (342–348). If the samples set now passes all of the tests, the rating algorithm 54 assigns the appropriate rating; otherwise the process continues until level 4 is reached, at which point the sample set is considered to be non-DTMF.

Figure 6:
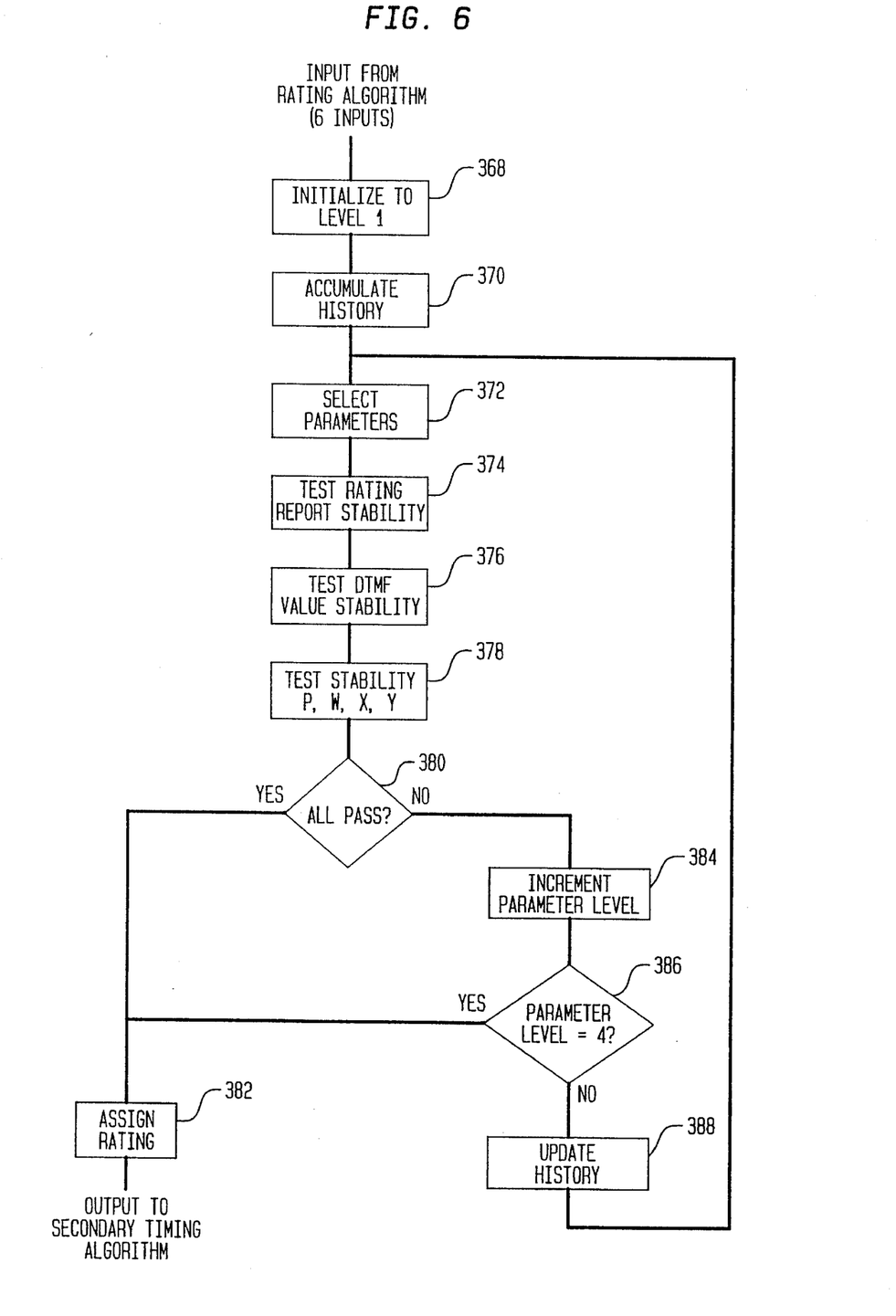
FIG. 6 is a flow chart of the timing/stability algorithm.

The timing/stability algorithm 56, shown in FIG. 6, receives the following inputs: the rating designated by the rating algorithm 54, the DTMF value, P, W, X, and Y, which comprise a sample set. The timing/stability algorithm determines the stability of these inputs over a set period of time.

Initially, the algorithm is initialized to level 1 (368), the inputs are received and stored, accumulating a history (370), and the algorithm selects the parameters for the given level and DTMF value (372). Each input is then tested for stability using the ratios of maximum to minimum as discussed above for the given DTMF value (374–378).

For each level, there are specific time periods and parameters. Each of the inputs are examined at the first level to determine whether it will satisfy the tests. If the inputs pass the first level of tests (380), then the timing/stability algorithm 56 will assign a rating of 1 (382). If all of the tests are not satisfied, the algorithm 56 will drop down to the next level and update the history (384, 388), and so on until the fourth level is reached (386). However, irrespective of the stability rating assigned, the ultimate rating may not be higher than the quality rating issued by the rating algorithm 54.

Figure 7:
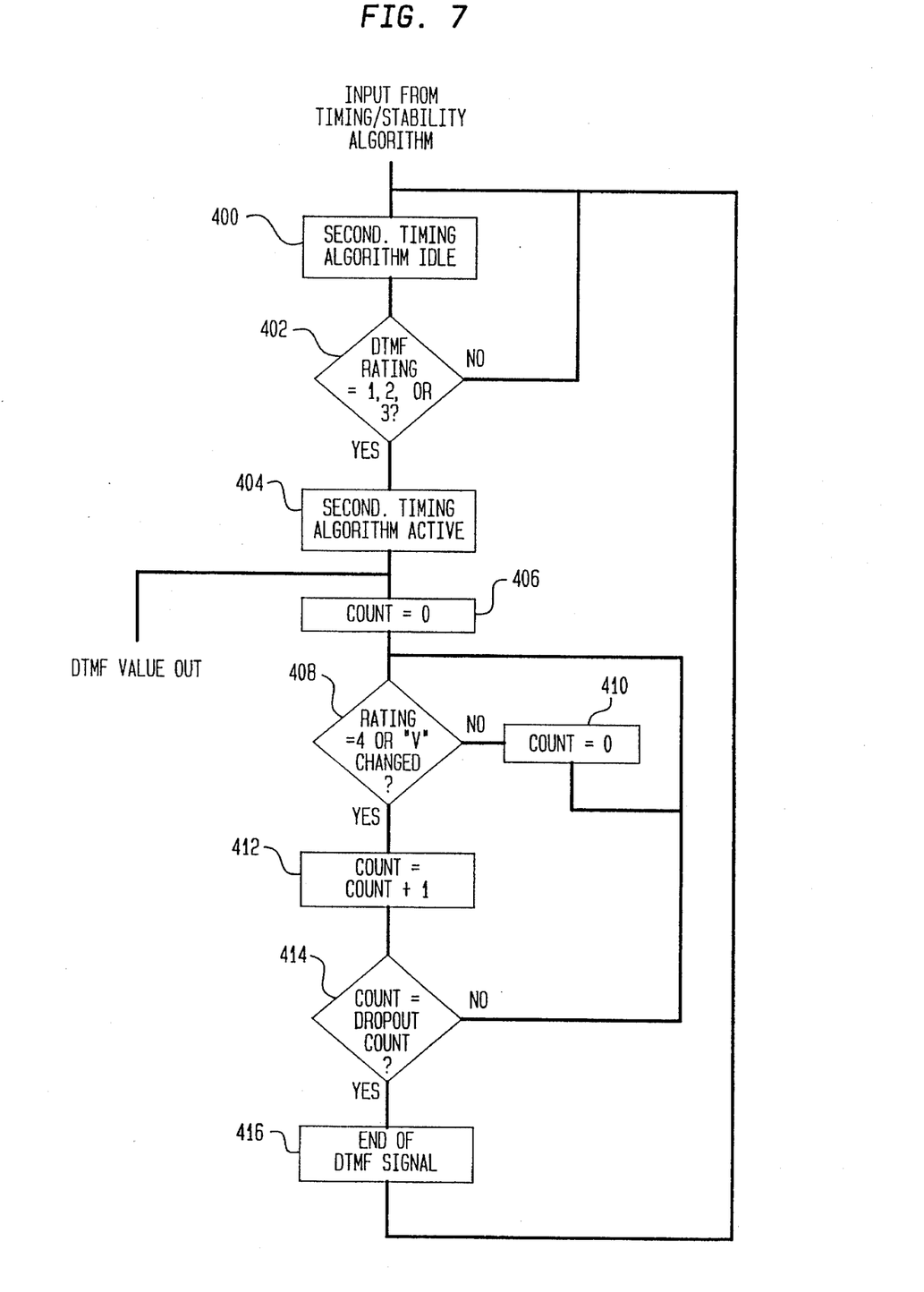
FIG. 7 is a flow chart of the secondary timing algorithm.

The timing/stability algorithm 56 passes on the rating of 1–4 and the DTMF value to the secondary timing algorithm 58, illustrated in FIG. 7. Initially, the secondary timing algorithm 58 is idle (400). However, if it receives a 1, 2, or 3 rating (402), it goes into the active mode (404), the DTMF value is issued, and a counter to monitor signal dropout is initialized to a zero count (406).

Once active, the secondary timing algorithm 58 begins checking for the end of the DTMF signal by looking for a change in the DTMF value or a rating of 4 (408). It cycles through this search every time a new sample is received, i.e., every 10 ms. Assuming no change, the counter is maintained at zero (410), and the check is repeated continuously every 10 ms (408).

When the secondary timing algorithm 58 does encounter either a change in DTMF value or a rating of 4, the counter begins running and is incremented a count of 1 (412). The counter will continue to increment as long as the rating has remained at 4 and/or the current DTMF value differs from the original value. After each increment of the counter, the secondary timing algorithm 58 checks to see if the count has reached the dropout count (414), which would indicate that the DTMF signal has terminated (416). Now, the algorithm will revert to the idle state (400).

If the rating returns to a 1, 2, or 3, and/or the DTMF value returns to the original value before the dropout count is reached (414), the secondary timing algorithm 58 will detect the change (408), reset the counter to zero (410), and resume checking for another change (408).

While there has been described what is believed to be the preferred embodiment of the invention, those skilled in the art will recognize that other and further modifications may be made thereto without departing from the spirit of the invention, and it is intended to claim all such embodiments that fall within the true scope of the invention. For example, one can vary the rating parameters, timing values, and bandpass filter performance. Also, the rating algorithm 54 could be modified to accept additional inputs such as frequency and noise measurements. Frequency can be measured by noting the phase in two successive 10 ms filter outputs, the change in phase indicating the frequency directly. Noise can be measured by using the amplitude, frequency, and phase measurements together to reconstruct the estimate sinusoids. These sinusoids are subtracted from the input, and the residual is the noise. The noise power can be measured as windowed sum of squares. The additional measurements were not used in the preferred solution because frequency stability is not guaranteed by EIA specifications for DTMF and noise calculations require intensive computation. However, they may offer significant talk-off improvement.

What is claimed is:

1. A system for detection and identification of a plurality of signals, where each signal has first and second components, each component having a specific frequency, and each signal having an assigned value corresponding to the specific frequencies of the first and second components of the signal, comprising:

means for identifying the signals;

first rating means for rating the signals at more than two quality levels, the first rating means utilizing a plurality of sets of rating parameters, separate sets of rating parameters being provided for different groups of the values; and means for determining the stability of the signals over a plurality of time periods, the means utilizing a plurality of sets of stability parameters, separate sets of stability parameters being provided for different groups of the values; and second rating means for rating the signals at a plurality of quality stability levels.

2. A system for detection and identification of a plurality of signals, as set forth in claim 1, wherein the signals are DTMF signals and the plurality of set of rating parameters includes a first set of parameters for each of DTMF values {2,3,6,B,C} and a second set of parameters for each of DTMF values {0,1,4,5,7,8,9,*,#,A,D}, and wherein the plurality of sets of stability parameters includes a first set of parameters for each of DTMF values {2,3,6,B,C} and a second set of parameters for each of DTMF values {0,1,4,5,7,8,9,*,#,A,D}.

3. A system for detection and identification of a plurality of signals, as set forth in claim 1, wherein the means for rating the quality of the signals includes:

means for making simultaneous first and second measurements of the power content of each of the plurality of signals; and means for comparing the first measurement with the second measurement.

4. A system for detection and identification of a plurality of signals, as set forth in claim 1, further including at least two window means for measuring the power content of the signals wherein one of the window means is a non-rectangular window means.

5. A system for detection and identification of a plurality of signals, as set forth in claim 4, wherein the non-rectangular window means is a Kaiser window.

6. A system for detection and identification of a plurality of signals, as set forth in claim 1, further including means for detecting the end of a signal.

7. A system for detection and identification of a plurality of signals, as set forth in claim 6, wherein the means for detecting the end includes means for detecting a change in the identification of the signal.

8. A system for detection and identification of a plurality of signals, as set forth in claim 1, wherein the means for determining the stability of the signals includes means for detecting a variation of the identification of the signals.

9. A system for detection and identification of a plurality of signals, as set forth in claim 1, wherein the means for determining the stability of the signals includes means for detecting a variation in the quality level.

10. A system for detection and identification of a plurality of signals, as set forth in claim 1, wherein the means for determining the stability of the signals includes means for detecting a variation of the power content which includes:

means for determining the minimum and maximum of the power content of the signals over one of the plurality of time periods; and means for comparing the minimum and maximum.

11. A system for detection and identification of a plurality of signals, as set forth in claim 1, further including a bandpass filter for minimizing the effect of finite transhybrid loss.

12. A system for detection and identification of a plurality of signals, where each signal has first and second components, each component having a specific frequency, and each signal having an assigned value corresponding to the specific frequencies of the first and second components of the signal, comprising:

means for identifying the signals;

rating means for rating the signals at more than two quality levels, the means utilizing a plurality of sets of rating parameters, separate sets of rating parameters being provided for different groups of the values.

* * * * *

UNITED STATES PATENT AND TRADEMARK OFFICE
CERTIFICATE OF CORRECTION

PATENT NO. : 5,528,663
DATED : June 18, 1996
INVENTOR(S) : Locke et al.

It is certified that error appears in the above-indentified patent and that said Letters Patent is hereby corrected as shown below:

On the title page of the patent, item 73, Assignee should read:
"Siemens Rolm Communications Inc., Santa Clara, California".

Signed and Sealed this

Twenty-ninth Day of October 1996

*Attest:*

BRUCE LEHMAN

*Attesting Officer*  *Commissioner of Patents and Trademarks*